US006362945B1

(12) United States Patent
Bobert et al.

(10) Patent No.: US 6,362,945 B1
(45) Date of Patent: Mar. 26, 2002

(54) GAS-FILLED SURGE ARRESTER WITH AN ACTIVATING COMPOUND FORMED OF A PLURALITY OF COMPONENTS

(75) Inventors: Peter Bobert, Falkensee; Jürgen Boy; Winfried Völkner, both of Berlin, all of (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 09/556,378

(22) Filed: Apr. 24, 2000

(30) Foreign Application Priority Data

Apr. 23, 1999 (DE) ........................................ 199 20 043

(51) Int. Cl.[7] ................................................ H02H 1/00
(52) U.S. Cl. ....................................... 361/120; 361/129
(58) Field of Search ................................ 361/117, 119, 361/120, 112, 129; 313/355

(56) References Cited

U.S. PATENT DOCUMENTS 4,266,260 A 5/1981 Lange et al. ................ 361/120
4,769,736 A * 9/1988 Boy ........................... 361/120
5,892,648 A * 4/1999 Bobert et al. ............... 361/120

FOREIGN PATENT DOCUMENTS

DE 37 23 571 A1 1/1989
DE 196 32 417 C1 5/1998

* cited by examiner

*Primary Examiner*—Michael J. Sherry
(74) *Attorney, Agent, or Firm*—Herbert L. Lerner; Laurence A. Greenberg; Werner H. Greenberg

(57) ABSTRACT

A gas-filled surge arrester includes at least two electrodes, a hydrogen-containing gas filling and an activating compound applied to at least one of the electrodes. In order to ensure the required operating behavior of the surge arrester even at temperatures to 40%, the activating compound contains nickel powder in an amount of 30 to 35% by weight and potassium silicate in an amount of 25 to 30% by weight as basic components, sodium bromide in an amount of 15 to 20% by weight, as well as aluminum powder, sodium silicate and barium titanate as further components each in an amount of 5 to 10% by weight.

1 Claim, 1 Drawing Sheet

GAS-FILLED SURGE ARRESTER WITH AN ACTIVATING COMPOUND FORMED OF A PLURALITY OF COMPONENTS

BACKGROUND OF THE INVENTION

FIELD OF THE INVENTION

The invention is in the field of electronic components and is to be used in the construction of gas-filled surge arresters with at least two electrodes, in which an activating compound including a plurality of components is applied to at least one of the electrodes to ensure igniting properties.

In the case of surge arresters filled with an inert gas, the respectively required operating behavior, such as a static sparkover voltage (DC sparkover voltage), dynamic sparkover voltage (surge sparkover voltage), extinguishing voltage and glow voltage as well as a current-carrying capacity under alternating current and unipolar pulsed current, can be influenced by various measures. Those measures may be the structural layout of the electrodes, the type and pressure of the gas filling, the configuration of one or more ignition strips on an inner wall of a glass or ceramic insulator and the selection of the activating compound disposed on the active surfaces of the electrodes. For example, there is a known surge arrester which has two electrodes that are fitted at the ends into a hollow-cylindrical ceramic insulator and which has mutually facing electrode surfaces that are coated with an activating compound of aluminum and magnesium oxide. In that case, the activating compound is disposed in depressions in the electrode surface. Furthermore, a plurality of axially running ignition strips, which are constructed as so-called central ignition strips, are disposed on the inner wall of the insulator without directly joining the electrodes, in U.S. Pat. No. 4,266,260. In the case of surge arresters with two ceramic insulators and a third, annular central electrode, it is similarly known from U.S. Pat. No. 4,769,736 to also place the activating compound (in that case sodium silicate) in depressions in the central electrode.

The activating compounds used for gas-filled surge arresters frequently include a plurality of components. In the case of an activating compound including three components, there is a known composition which contains aluminum as a first component in an amount of approximately 25% by weight, a sodium bromide as a second component in an amount of approximately 50% by weight and a barium titanate as a third component in an amount of approximately 25% by weight. In that case, the gas filling contains not only an inert gas such as argon but also hydrogen in an amount of 5 to 20% by volume. Such an activating compound, according to German Patent DE 196 32 417 C1, is distinguished by a high adhesive strength over heavy-duty discharge gaps with low sparkover voltage.

With regard to high-voltage spark gaps it is also known in the case of a gas filling of pure nitrogen to use an activating compound which, apart from sodium or potassium silicate, additionally contains nickel. That structure, according to German Published, Non-Prosecuted Patent Application DE 37 23 571 A1, improves the long-term constancy of the ignition voltage.

SUMMARY OF THE INVENTION

It is accordingly an object of the invention to provide a gas-filled surge arrester with an activating compound formed of a plurality of components, which overcomes the hereinafore-mentioned disadvantages of the heretofore-known devices of this general type and which, starting from a gas-filled surge arrester with at least two electrodes, with a hydrogen-containing gas filling and with an activating compound including a plurality of components, puts the components of the activating compound together in such a way that the surge arrester has a good current-carrying capacity under alternating current (test: 60 times 1A, 1 sec.) and under unipolar pulsed current (test: 1500 times 10A, wave 10/1000 μsec.) even at temperatures to −40° C., while maintaining a low sparkover surge voltage (for example at 100 V/sec. lower than 550 V), a constant extinguishing voltage and a constant DC sparkover voltage.

With the foregoing and other objects in view there is provided, in accordance with the invention, a gas-filled surge arrester, comprising at least two electrodes; a hydrogen-containing gas filling; and an activating compound applied to at least one of the electrodes, the activating compound containing nickel powder in an amount of 30 to 35% by weight and potassium silicate in an amount of 25 to 35% by weight as basic components, sodium bromide in an amount of 15 to 20% by weight, and aluminum powder, sodium silicate and barium titanate as further components each in an amount of 5 to 10% by weight.

With such a combination of the components of the activating compound, the actual igniting and extinguishing properties of the surge arrester are essentially ensured by the potassium silicate component in combination with the hydrogen-containing gas filling, while the sodium bromide, barium titanate, sodium silicate and aluminum powder components stabilize the DC sparkover voltage and the nickel powder component guarantees the good extinguishing behavior before and after loading.

The novel electrode activating compound is suitable both for applying to the hollow-cylindrical central electrode of two-gap arresters and for applying to the end electrodes of two-gap and three-gap arresters.

Other features which are considered as characteristic for the invention are set forth in the appended claims.

Although the invention is illustrated and described herein as embodied in a gas-filled surge arrester with an activating compound formed of a plurality of components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
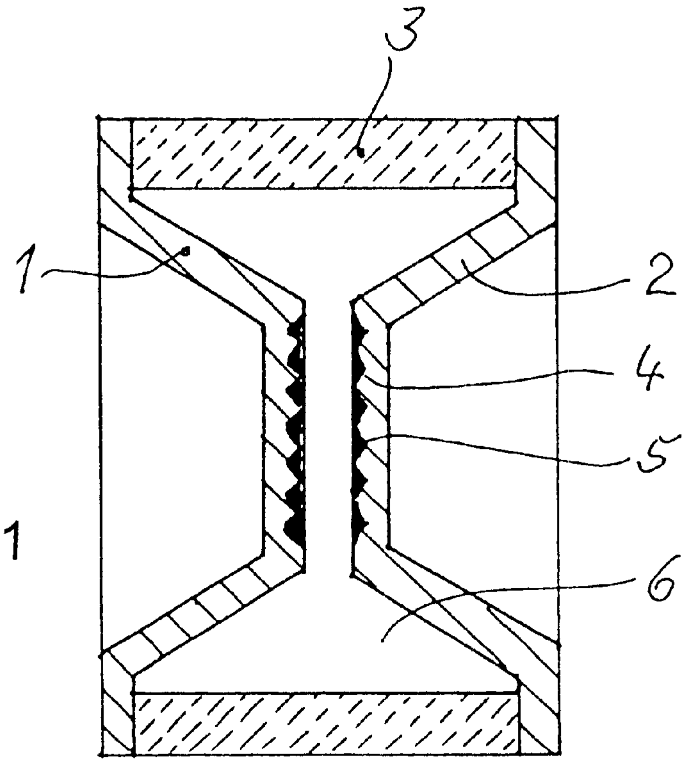
FIG. 1 is a diagrammatic, sectional view of a two-electrode surge arrester according to the invention.

Referring now to the figures of the drawings in detail and first, particularly, to FIG. 1 thereof, there is seen a surge arrester which includes two cup-shaped electrodes 1 and 2 that are made of copper and are soldered at their ends into a ceramic insulator 3. Active surfaces of the two electrodes are provided with a waffeling 4, into which an activating compound 5 has respectively been introduced. This activating compound has the following composition:

potassium silicate, 28% by weight nickel powder, 32% by weight sodium bromide, 18% by weight barium titanate, 7% by weight aluminum powder, 8% by weight sodium silicate, 7% by weight A gas space of the surge arrester is provided with a gas filling 6 of argon, which contains approximately 10% hydrogen.

Figure 2:
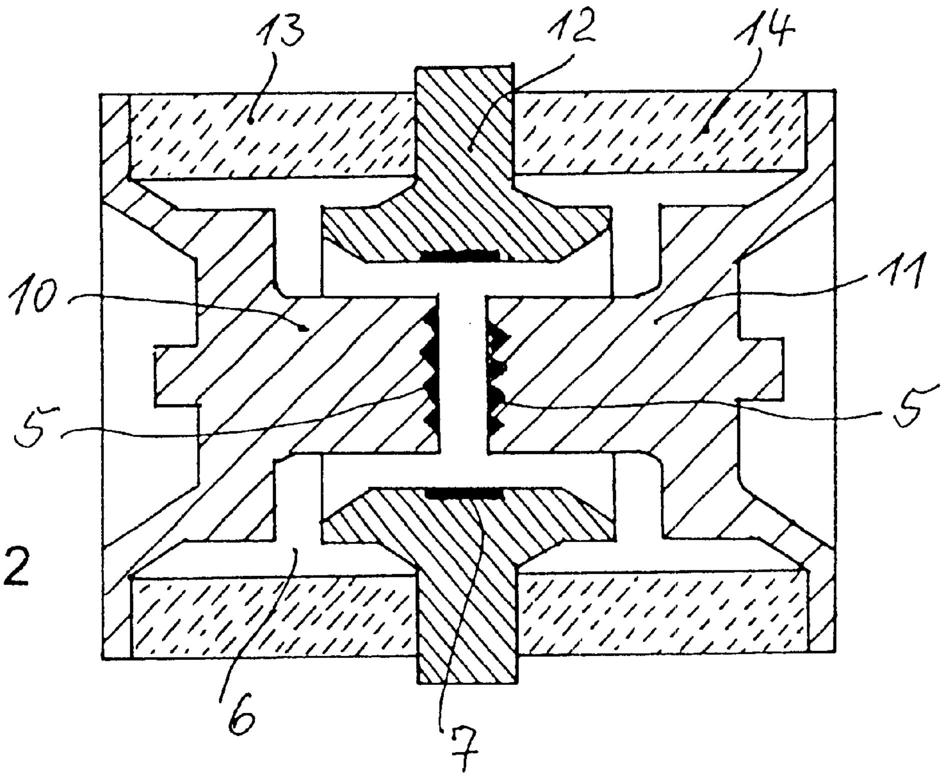
FIG. 2 is a sectional view of a three-electrode surge arrester according to the invention.

FIG. 2 shows a gas-filled surge arrester which has two discharge gaps and, for this purpose, includes two end electrodes 10 and 11 as well as a tubular central electrode 12, that is soldered to end surfaces of two ceramic insulators 13 and 14. In this case, the two electrodes 10 and 11 are likewise provided outside the two discharge gaps, in the region of their end surfaces, with a waffeling, into which an activating compound 5 has been introduced. The central electrode 12 is provided with an annular recess, into which an activating compound 7 has been introduced. The activating compound 5 is the same compound as that used for the single-gap arrester according to FIG. 1. The activating compound 7 may be the same compound.

We claim:

1. A gas filled surge arrester, comprising:

at least two electrodes;

a hydrogen-containing gas filling; and an activating compound applied to at least one of said electrodes, said activating compound containing nickel powder in an amount of 30 to 35% by weight and potassium silicate in an amount of 25 to 30% by weight as basic components, sodium bromide in an amount of 15 to 20% by weight, and aluminum powder, sodium silicate and barium titanate as further components each in an amount of 5 to 10% by weight.

* * * * *